(No Model.) 2 Sheets—Sheet 1.

A. F. OESTERREICH.
PROCESS OF TREATING WHEAT IN MANUFACTURING FLOUR.

No. 601,777. Patented Apr. 5, 1898.

WITNESSES

INVENTOR (No Model.) 2 Sheets—Sheet 2.

A. F. OESTERREICH.
PROCESS OF TREATING WHEAT IN MANUFACTURING FLOUR.

No. 601,777. Patented Apr. 5, 1898.

WITNESSES INVENTOR

UNITED STATES PATENT OFFICE.

AUGUST F. OESTERREICH, OF WINNECONNE, WISCONSIN.

PROCESS OF TREATING WHEAT IN MANUFACTURING FLOUR.

SPECIFICATION forming part of Letters Patent No. 601,777, dated April 5, 1898.

Application filed March 19, 1896. Serial No. 583,943. (No specimens.)

*To all whom it may concern:*

Be it known that I, AUGUST F. OESTERREICH, a citizen of the United States, residing at Winneconne, in the county of Winnebago and State of Wisconsin, have invented certain new and useful Improvements in Processes of Treating Wheat in the Manufacture of Flour; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a process of treating wheat in the manufacture of flour.

The process consists, essentially, in first rapidly moving the wheat and slightly moistening it in transit with water without soaking the bran, next passing the wheat through a polisher and at the same time subjecting it to dry heat and mutual attrition, whereby it is dried, seasoned, and polished, and finally passing the wheat in the bran to the first break-rolls of a flour-mill.

The process may be carried out by any suitable apparatus; but I have designed a machine for carrying out the same which consists of certain novel constructions, combinations, and arrangements of parts, as will be hereinafter particularly described and claimed.

My invention is particularly designed for use in connection with the more modern style of milling, commonly known as the "roller process," in which process the bran is not removed from the kernel before the wheat is passed to the first break-rolls. It is well known to those skilled in the art that wheat is often not properly seasoned before being passed to the breaking-rolls. Sometimes it is too damp and smutty, and again it is too dry. In order to enable the rollers to readily unbran the wheat, the wheat can be properly moistened without soaking and be quickly dried, seasoned, and polished without roasting.

In carrying out my process I employ a machine as will be hereinafter described and claimed; but I do not wish to limit the carrying out of the process to said machine, as it might be possible to accomplish it successfully with a differently-constructed apparatus.

Figure 1:
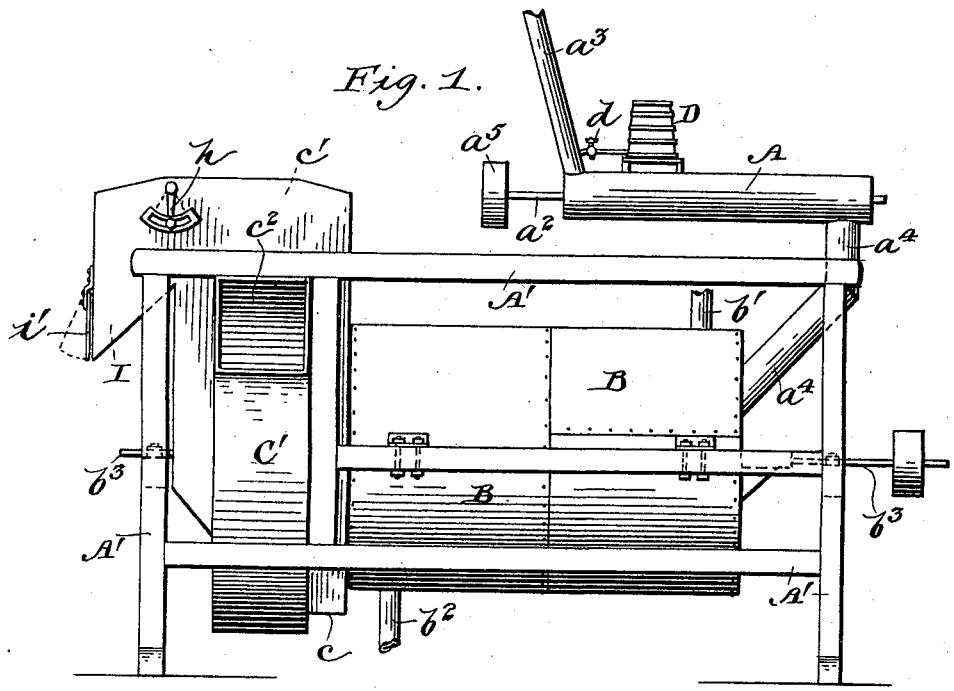
Figure 3:
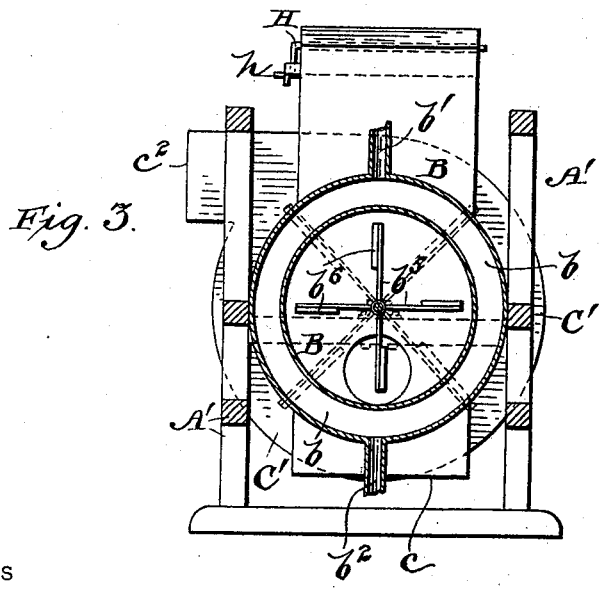
Figure 2:
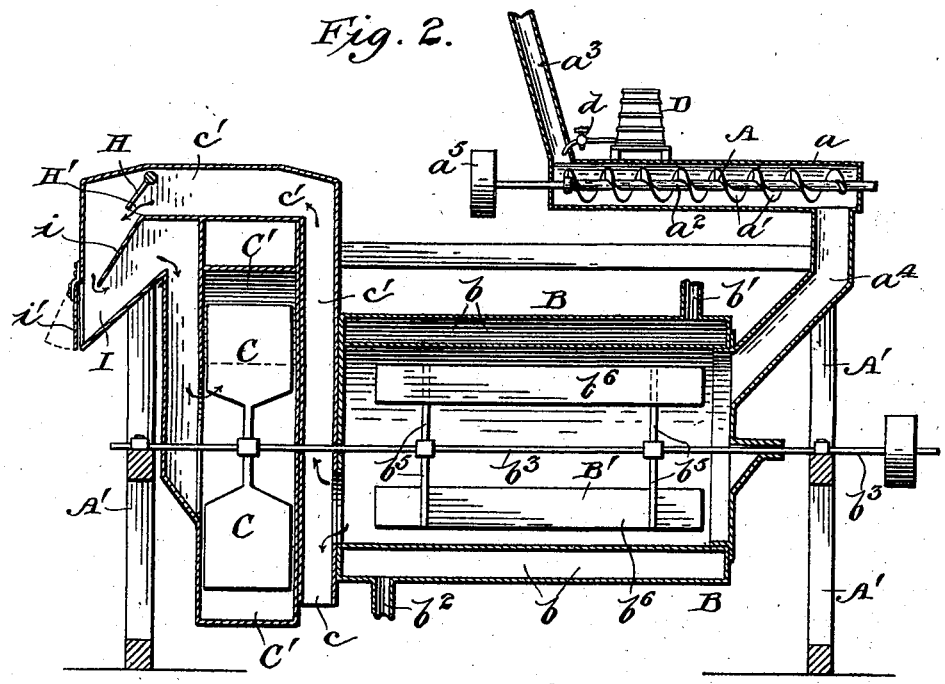
Figure 4:
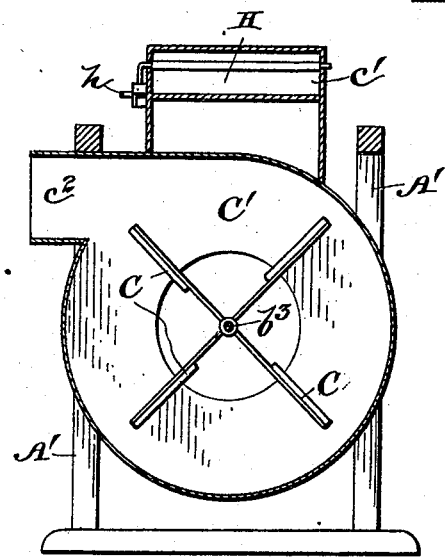

In the accompanying drawings, Figure 1 is a side view of the devices embodying my invention. Fig. 2 is a vertical longitudinal section through the same. Fig. 3 is a transverse section through the machine on the line of the agitator, and Fig. 4 is a transverse section through the machine on the line of the fan or blower.

A in the drawings represents a screw conveyer mounted on a frame A'; B, a seasoning and polishing cylinder; C, a suction-fan, and D a water-supply.

The screw conveyer comprises a cylindrical casing $a$ and a spiral blade $a'$, mounted upon a rotatable shaft $a^2$, journaled in the casing. The forward end of the casing is provided with an inlet-pipe $a^3$ and the rear end with a discharge-pipe $a^4$, leading to the cylinder B. The forward end of the shaft $a^2$ is provided with a belt-wheel $a^5$, by means of which the conveyer is rotated to move the grain rapidly through the cylinder, so that the grain will be moistened without being soaked. A water-supply spigot $d$, connected to a supply-tank D, discharges a regulated supply of water into the front end of the casing $a$, so that the grain may be suitably dampened upon entering said casing. The grain falling from the lower end of the discharge-pipe $a^4$ empties into the open end of the cleaning and drying cylinder B and is conveyed rapidly forward. This cylinder is rigidly mounted in the frame A' and is provided with double walls, forming a chamber $b$ for the circulation of a drying agent. This chamber is provided with an inlet $b'$ in its upper portion and an outlet $b^2$ in its bottom for the dead steam and condensed water or other agent, as hot air. The agitator B' is rigidly mounted upon a rotatable shaft $b^3$ and rotates within the cylinder B, the inner surface of which is smooth, to thoroughly clean, season, and dry the grain. The agitator consists of a number of radiating arms $b^5$, mounted on the shaft $b^3$ and provided at their outer end with broad blades $b^6$ for sweeping the grain around against the smooth inner wall of the cylinder and thereby polishes the same.

The gravity of the wheat carries it into and through the beaters, and after passing through the latter the heavy grain drops down through a discharge-pipe c. The fan C is mounted in a drum C' on shaft $b^3$ and operates to draw the chaff and other light foreign substances forward and through the suction-pipe c', as indicated by the arrows, and forces them out through the outlet $c^2$. The operation of the fan C also cools the grain. A valve H in pipe c' is operated by a handle h to increase or decrease the extent of an opening H' and thus regulate the draft for the purpose of cooling the grain properly and effectually eliminating and carrying away the foreign substances. A trap I is provided in the pipe c' and the air drawn through said pipe is forced down through the trap before reaching the fan by a partition i. This trap I has an inclined bottom and is provided with a hanging discharge-valve i, whereby the light grain and seeds collecting in the trap are automatically discharged, as hereinafter more particularly described. The passage of the grain through the beaters $b^6$ $b^6$ cleanses, seasons, and polishes the wheat and eliminates from the surface of the kernel all foreign substances, in addition to properly drying and toughening it. These foreign substances pass upward, as indicated by the arrows in Fig. 3, and the dust passes out through the fan-discharge $c^2$. The heavier material, consisting of light wheat, small seeds, &c., passes through the pipe c' and drops down into the trap against the valve, the lighter substances, if any, being carried around through the fan, as indicated by the arrows. The valve i' operates automatically and is controlled by the suction of the fan. When the weight of the substances upon the incline floor of the trap becomes sufficient, the valve will be opened because of the weight of the substances and the substances drop to the bin beneath. The suction of the fan will close the door again when the substances have all been deposited. The light grain discharging through the valve i' is not proper for grinding or milling into flour, but may be used for feed, &c.

The miller operating the machine, being an expert, tests the wheat by handling to ascertain the proper condition for milling and regulates the supply of water and heat and the rapidity of the moving parts of the machine. The water employed is perfectly-clean cold water. I use the expression "cold" as a relative term to steam or hot water, which latter, if brought in contact with the wheat, would scald the same.

From the aforegoing description it will be seen that my machine is not an unbranner, neither does it soak, scald, or roast the wheat, and that steam or hot water never comes in direct contact with the wheat; that by passing the wheat rapidly through clean cold water the wheat is cleansed, without being soaked or scalded, by passing it into a cylinder inclosed by a jacket containing a drying and heating agent and subjecting the wheat to mutual attrition it is dried, seasoned, and polished, and by passing it through a fan inferior wheat and chaff are separated and the wheat is ready to be passed to the first break-rolls, unbranned, dried, seasoned, and polished.

Having described my invention, what I claim as new, and desire to secure by Letters Patent, is—

The continuous process of treating wheat in the manufacture of flour which consists essentially in first rapidly moving the wheat and slightly moistening it in transit with water without soaking the bran, next passing the wheat through a polisher and at the same time subjecting it to dry heat and mutual attrition whereby it is dried, seasoned, and polished, and finally passing the wheat thus prepared, in the bran, to the first break-rolls, substantially as described.

In testimony whereof I affix my signature in presence of two witnesses.

AUGUST F. OESTERREICH.

Witnesses:
S. WILMOT,
M. W. CHONINARD.